United States Patent [19]

Janssens et al.

[11] Patent Number: 4,470,534

[45] Date of Patent: Sep. 11, 1984

[54] GLAZING PANELS AND METHOD AND APPARATUS FOR BONDING THEM TOGETHER

[75] Inventors: Théo Janssens, Mol; Victor Willems, Retie, both of Belgium

[73] Assignee: BFG Glassgroup, Paris, France

[21] Appl. No.: 339,080

[22] Filed: Jan. 13, 1982

Related U.S. Application Data

[62] Division of Ser. No. 64,526, Aug. 6, 1979, Pat. No. 4,331,282.

[30] Foreign Application Priority Data

Aug. 11, 1978 [GB] United Kingdom ............... 33135/78

[51] Int. Cl.[3] .......................... C03B 23/24; B23K 3/04

[52] U.S. Cl. ...................................... 228/45; 156/107; 228/47; 432/225

[58] Field of Search ................ 156/107; 228/188, 122, 228/45, 47; 432/225, 231; 269/111

[56] References Cited

U.S. PATENT DOCUMENTS

| | | | |
|---|---|---|---|
| 2,235,681 | 3/1941 | Haver | 228/188 X |
| 2,900,762 | 8/1959 | Lighton | 432/225 |
| 2,964,105 | 12/1960 | Olson et al. | 431/202 |
| 3,149,825 | 9/1964 | Watkins | 432/231 |
| 3,227,593 | 1/1966 | Woelk | 156/107 X |
| 3,392,972 | 7/1968 | Wing | 269/111 X |

*Primary Examiner*—Kenneth J. Ramsey
*Attorney, Agent, or Firm*—Spencer & Frank

[57] ABSTRACT

In the manufacture of glazing panels comprising sheets marginally bonded together, in order to simplify and speed up production, an apparatus for effecting bonding between at least one such sheet and one or more members assembled in marginal contact therewith. The apparatus includes treatment means which is carried by a frame. In order to accomodate assemblies of different sizes carried by a support, each beam of the frame is coupled at one end relative to a movable coupling, whereby the end of each beam is movable along another beam in the direction of whose length its end coupling is movable, so that the size of the frame can be adjusted.

34 Claims, 4 Drawing Figures

GLAZING PANELS AND METHOD AND APPARATUS FOR BONDING THEM TOGETHER

CROSS REFERENCE TO RELATED APPLICATION

This application is a divisional application of applicants' copending U.S. application Ser. No. 064,526, filed Aug. 6th, 1979, now U.S. Pat. No. 4,331,282.

BACKGROUND OF THE INVENTION

The present invention is concerned with the manufacture of glazing panels comprising sheets marginally bonded together, and relates to a method of effecting bonding between at least one said sheet and one or more members assembled in marginal contact with said sheet. The invention includes panels manufactured by the method, and apparatus for putting the method into effect.

SUMMARY OF THE INVENTION

It is an object of the invention to provide a new and improved method of effecting such bonding.

According to the present invention, there is provided in the manufacture of glazing panels comprising sheets marginally bonded together, a method of effecting bonding between at least one said sheet and one or more members assembled in marginal contact with said sheet, characterised in that while the assembly is within the effective sphere of operation of treatment means which is carried by a frame such treatment means acts or is caused to act simultaneously on each side margin of the assembly to bond it together.

The invention thus provides a new method of effecting such bonding which can be performed more rapidly than previously known methods in which the various side margins of such an assembly are treated successively, and which is therefore more suited to use in series production of glazing panels.

Preferably, said frame is adjustable in size and is so adjusted in dependence upon the size of a said assembly which is to be treated. In this way the invention is applicable to the bonding of assemblies of different sizes on a single production line.

The invention is useful for bonding sheets of glazing material together directly, by means of a marginal layer of adhesive material which is caused to bond the sheets together by the treatment, or by means of a layer of solder alloy intervening between metallised marginal strips of the glazing sheets. The invention is also useful for bonding a marginal frame of spacer strip material to a single sheet preparatory to the application and bonding to such frame of a further sheet.

Preferably however, said assembly comprises at least one pair of sheets and a spacer frame intervening between and contacting the margins of each sheet of the pair or each pair. In this case bonding of the whole panel may be effected in one step.

In some embodiments of the invention, said treatment means is caused to act progressively along the length of each side of the assembly, but it is preferred that such means should act or be caused to act simultaneously around the whole margin of the assembly.

There are various types of treatment which may be applied in accordance with the invention, for example sealant or glue or molten solder may be sprayed onto the margin of the assembly. Such processes are however, difficult to apply in a clean fashion and generally involve some wastage of the sprayed material. Advantageously therefore said treatment is a heat treatment which causes a bonded material previously applied to the margin of the assembly to bond the assembly together.

Various bonding materials may be used in a process according to the invention. As examples will be cited heat curable or thermosetting materials and thermoplastics materials which can be melted in situ to bond the assembly together on cooling.

Advantageously, such heat treatment is such as to melt pre-applied solder to bond the assembly together.

Such solder may be pre-applied to one or more metallised sheet margins and/or to a metallic spacer frame contacting such sheet margins in the assembly. Preferably such solder is applied to each contacting surface.

In embodiments of the invention in which a said assembly is to be bonded together using pre-applied solder, it is especially preferred that said heat treatment should be effected by subjecting the margin of the assembly to flame action, preferably reducing flame action. This provides a very convenient and rapid way of melting the pre-applied solder.

Of course the heating may be effected in other ways. In one very suitable way, the heating is effected inductively.

The invention includes a glazing panel manufactured by a method as described above.

The invention extends to apparatus which may be used for putting the method of the invention into effect and accordingly provides, for the manufacture of glazing panels comprising sheets of glazing material bonded together at their margins, apparatus for effecting bonding between at least one said sheet and one or more members in marginal contact therewith, characterised in that such apparatus comprises a support for a said assembly, a frame made using beams each of which is coupled at one end relatively to a movable coupling whereby the end of that beam is relatively movable along another beam in the direction of whose length its end coupling is movable, so that the size of the frame can be adjusted, and treatment means carried by each of said beams arranged for simultaneous energisation to treat each side of a said assembly.

Such apparatus is especially adapted for performing the method according to the invention, and by virtue of its adjustability, it can be used for the treatment of the margins of different sized panels.

Advantageously, said support and frame are arranged for relative approach to promote the efficiency of the treatment, and optimally said frame is vertically movable.

Preferably, said beams are connected to a support structure using rams, e.g. pneumatically operable rams, arranged to lower and raise the frame with respect to the support for the assembly.

In the most preferred embodiments of the invention, said support structure comprises two parallel upstanding portals which are interconnected by first and second parallel bars of which one is fixed to the portals and the other is slidable along them, and said parallel bars are themselves interconnected by a third bar which is parallel to said portals, is slidable along said first and second bars and is slidable across at least one of said first and second bars.

Preferably said beams are carried by said three bars and by one of said portals.

Advantageously, clamping means is provided for clamping said assembly together on its support during the treatment.

Preferably said clamping means comprises weights which are advantageously mounted for relative movement with respect to the beam.

In embodiments of the invention in which said support and frame are arranged for relative vertical approach, it is found very convenient when such clamping means comprises weights carried by each said beam and mounted for relative vertical movement with respect to the beams. In this way, as the support and frame approach one another, the weights come to rest on an assembly on the support so that it is clamped together in position for treatment.

Advantageously, said support is a conveyor, and said treatment means is vertically moveable to effect said relative approach. This feature makes the apparatus very suitable for series production of hollow glazing units.

Said treatment means may be of any appropriate kind, for example it could comprise rows of spray nozzles for spraying glue or solder onto the margins of the assembly, but preferably said treatment means is constituted as heating means.

Such heating means may be arranged to heat the assembly margins in any convenient manner, for example by induction, but preferably for the production of solder bonded assemblies, said heating means comprises a row of burner nozzles on each said beam, and preferably each such row extends substantially the full length of its beam.

BRIEF DESCRIPTION OF THE DRAWINGS

The present invention will now be described in greater detail with reference to the accompanying drawings in which.

DESCRIPTION OF THE PREFERRED EMBODIMENT

Figure 1:
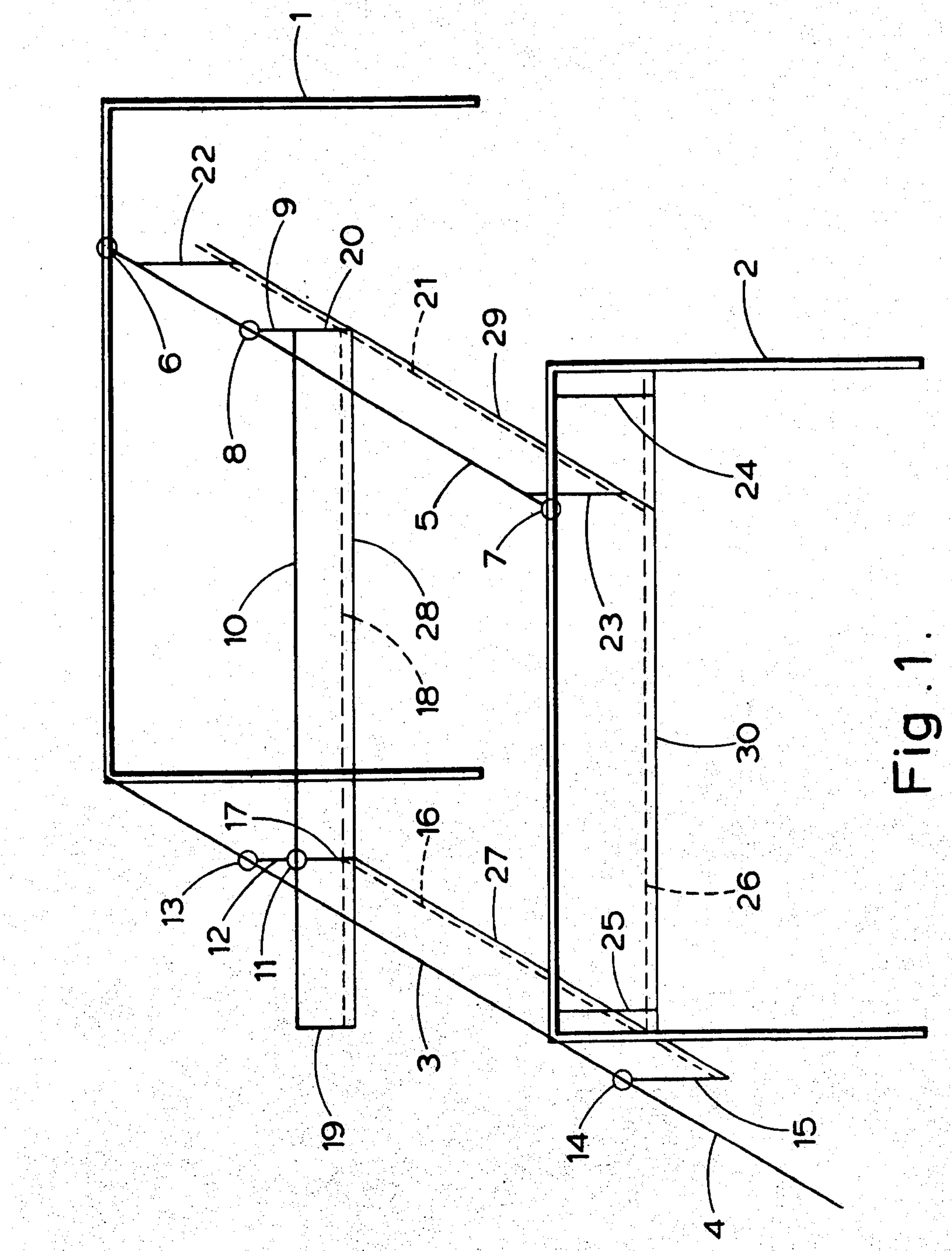
FIG. 1 is a diagrammatic perspective view illustrating an embodiment of apparatus for performing the invention.

The apparatus according to the invention diagrammatically illustrated in FIG. 1 comprises two parallel upstanding portals 1,2. These portals are interconnected at a corner by a fixed transverse bar 3 which has a portion 4 projecting beyond the second portal 2. The portals are also interconnected by a second transverse bar 5 mounted on brackets 6,7 respectively slidable along the portals 1,2 so that the second bar 5 can be moved to and fro parallel with the first, fixed transverse bar 3.

A further slide bracket 8 is mounted on the second transverse bar 5 for movement therealong and carries a mounting 9 to which is fixed one end of a third bar 10 which extends parallel with the portals 1,2. A slide bracket 11 is provided slidable along the third bar 10 and this bracket is fixed by means of a mounting 12 to another bracket 13 slidable along the fixed transverse bar 3.

A bracket 14 slidable along the projecting portion 4 of the fixed transverse bar 3 carries a depending strut 15 to which is fixed one end of a beam 16 whose other end is supported by a strut 17 carried by the slide bracket assembly 11, 12, 13 where the fixed transverse bar 3 and the third bar 10 cross over. A second beam 18 is slung beneath the third bar 10 by means of struts 19, 20 interconnecting their ends. A third beam 21 is slung beneath the second bar 5 by struts 22, 23 which may be fixed either to that bar or to the slides 6, 7. Further struts 24, 25 are fixed to the second portal 2 and support a fourth beam 26. The beams 16, 18, 21 and 26 are shown in dotted lines.

It will thus be seen that by movement of the second and third bars 5, 10 the size and shape of the rectangular frame defined by the four beams 16, 18, 21, 26 can be varied at will.

In accordance with the invention, each of the beams 16, 18, 21 and 26 carries treatment means respectively 27, 28, 29, 30 arranged for simultaneous energisation in order to treat the four side margins of a rectangular sheet of glazing material located on an appropriately positioned support (not shown) in order to bond the sheet to one or more members in marginal contact therewith.

In a variant of the embodiment illustrated the struts 15, 17, 19, 20, 22, 23, 24, 25 are connected to the beams they support by pneumatic rams so that the rectangular frame formed by the beams can be raised to allow access to an underlying support for removal or placement of a said sheet which has been or is to be treated.

A specific practical embodiment of the principle of the invention as illustrated in FIG. 1 will now be described with reference to FIGS. 2, 3 and 4.

Figure 2:
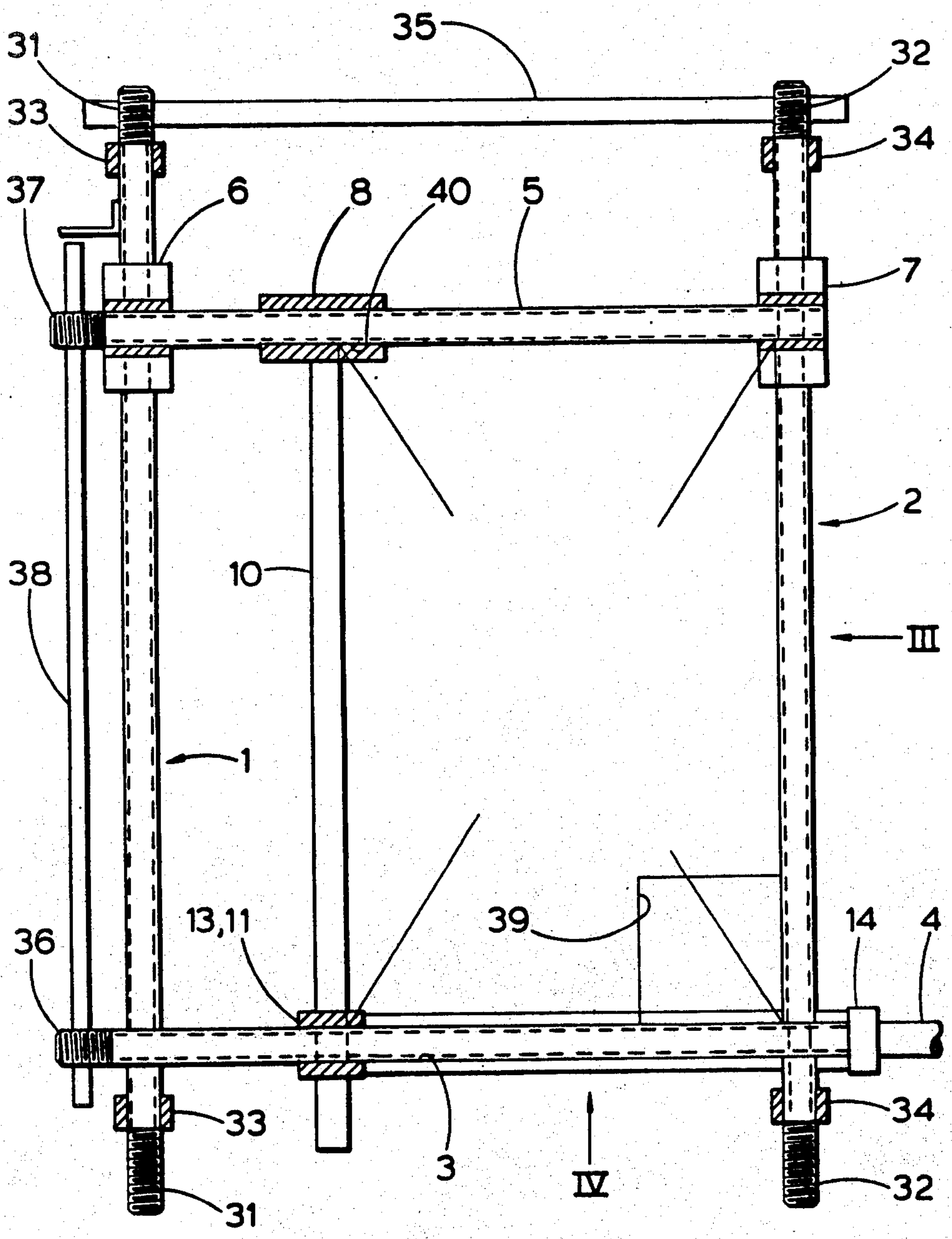
FIG. 2 is a plan view of an embodiment of such apparatus.
Figure 3:
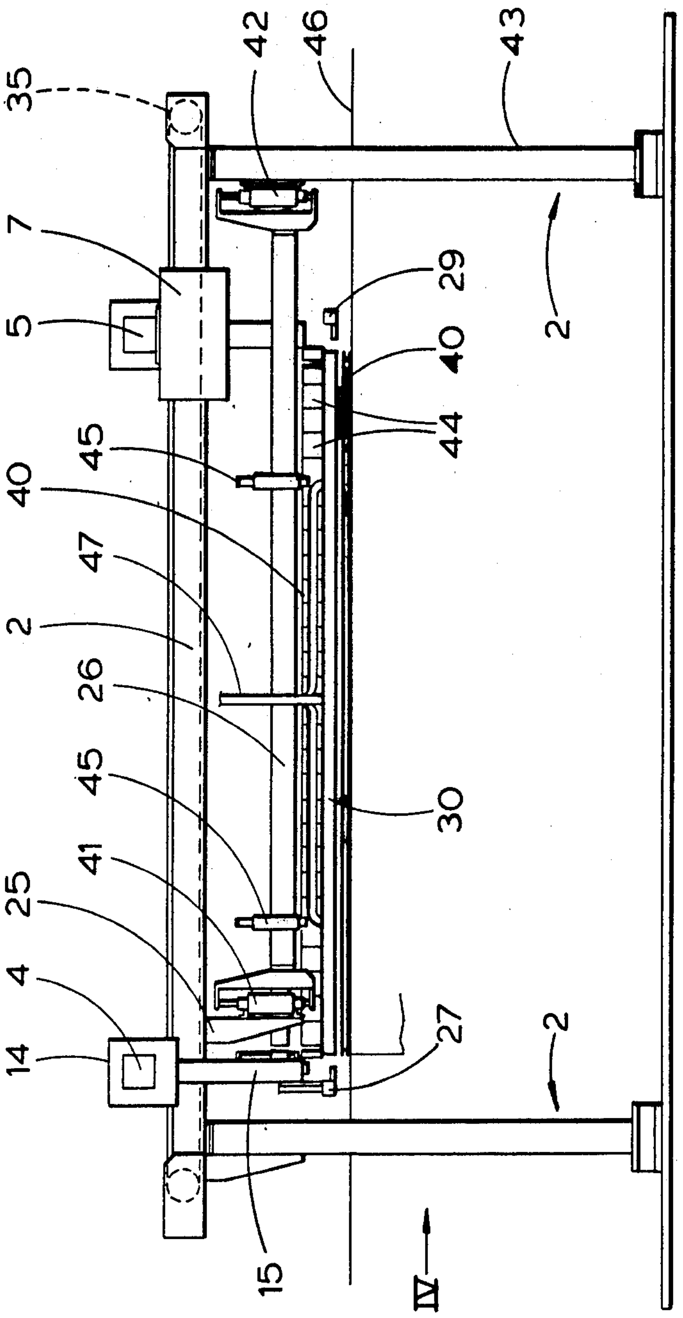
FIGS. 3 and 4 are elevations respectively in the directions of the arrows III and IV of FIG. 2.
Figure 4:
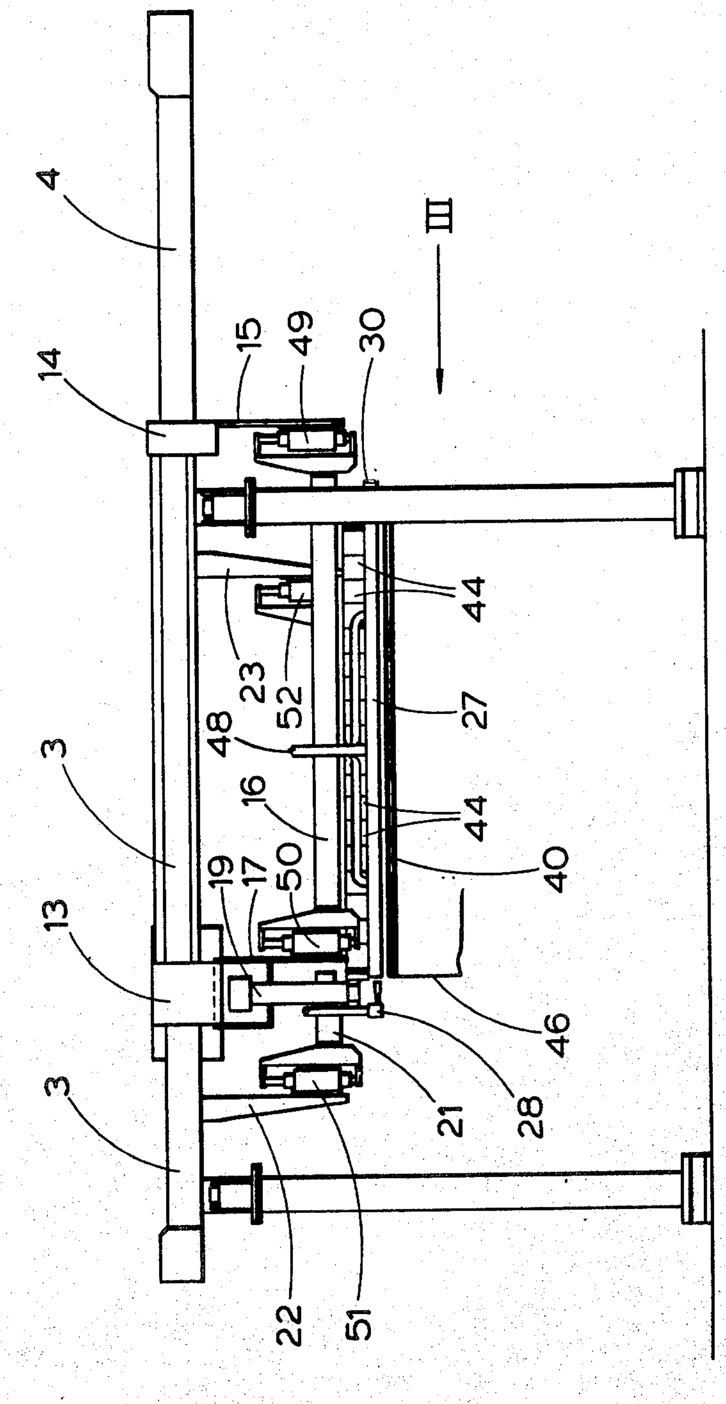

In FIGS. 2 to 4, various parts also shown in FIG. 1 are given identical reference numerals.

As shown in FIG. 2, each of the portals 1, 2 carries a worm respectively 31, 32 mounted in bearings 33, 34. These worms 31, 32 are driven by a common drive shaft 35 so that the slide brackets 6,7 can be moved synchronously. Similarly, each of the transverse bars 3, 5 supports a worm 36, 37 driven by a common drive shaft 38 for synchronous movement of the slide brackets 8, 13. This enables the bonding treatment to be carried out on sheets varying in size from that illustrated at 39 to that illustrated at 40. It will be noted that for treatment these sheets are both indexed so that sides of them lie under the portal 2 and under the fixed transverse bar 3.

From FIG. 3 it will be noted that the beam 26 supported from the portal 2 is carried at each end by a double acting pneumatic ram 41, 42 so that it may be raised and lowered. One of these rams 41, is attached to the strut 25 (compare FIG. 1) and the other is attached directly to an upright 43 of the portal 2 instead of the strut 24 shown in FIG. 1. The beam 26 carries a plurality of clamping weights 44 mounted on slide members 45 so that as the beam 26 is lowered, the weights can rest on the margin of a glazing assembly 40 on support 46. The beam also carries treatment means 30 constituted as a fixed burner fed with gas by a branched feed line 47. Also shown in FIG. 3 are burners 27,29 similarly carried by the transverse beams 16, 21 respectively (FIG. 1).

FIG. 4 shows clamping weights 44 similarly supported on transverse beam 16, though slide members such as 45 (FIG. 3) are not shown. The burner 27 carried by the beam 16 is fed with gas from a branched feed line 48. The beam 16 itself is hung from the struts 15, 17 (see also FIG. 1) by means of double acting pneumatic rams 49, 50 respectively, while the beam 21 is slung from its associated struts 22, 23 by rams 51, 52. FIG. 4 also shows as treatment means 28 a burner carried by the beam 18 (FIG. 1) which is suspended from its struts of which only one (19) is shown, by rams which are not shown.

In operation, a glazing assembly such as 40 is positioned on the support 46. Such an assembly may for example consist of two sheets of glass having metallised and solder-coated marginal strips which are separated by a solder-coated metallic spacer member in the shape of a frame. The positions of the bars 5 and 10 are adjusted as necessary to take account of the size and shape of the glazing assembly. This may be done before or after positioning of the assembly on the support 46. Of course in the case of series production of glazing assemblies of uniform size it will only be necessary to adjust the positions of the beams at the start of the production run. The frame defined by the beams 16, 18, 21, 26 is then lowered by the various pneumatic rams so that the clamping weights 44 rest on the margins of the glazing assembly 40 holding its sheets together and in position. Gas is then fed to the burners 27, 28, 29, 30 and ignited simultaneously to melt the solder previouly applied to the margins of the glazing assembly so that when it cools and solidifies, after the gas has been cut off, the assembly is bonded together as a unit. The beams are then raised and the glazing assembly is removed. Simultaneous ignition may be achieved in any suitable manner, for example by means of a spark generator, a hot coil, or a pilot light.

Though the invention has been particularly described with reference to the melting of pre-applied solder by gas burners, it will be appreciated that the bonding treatment may be effected in various different ways using different treatment means as has been referred to herein before.

The support 46 may be constituted as a portion of a conveyor line.

What is claimed is:

1. An apparatus for the manufacture of glazing panels comprising sheets of glazing material bonded together in their margins, which effects bonding between at least one of said sheets and at least one member assembled in marginal contact therewith to form an assembly, comprising: a support for said assembly, a frame comprised of beams which are supported using movable couplings whereby an end of each of said beams is relatively movable along an adjacent beam so that the size of the frame can be adjusted, a support structure for said beams comprising two parallel upstanding portals which are interconnected by first and second parallel bars of which at least one is slidable along the portals and a third bar which is parallel to said portals, is slidable along said first and second bars and is also slidable across at least one of said first and second bars, and treatment means carried by each of said beams arranged for simultaneous energisation to treat each side of said assembly.

2. Apparatus according to claim 1, wherein said support and frame are arranged for relative approach.

3. Apparatus according to claim 2, wherein said frame is vertically movable.

4. Apparatus according to claim 3, wherein said beams are connected to said support structure using rams, arranged to lower and raise the frame with respect to the support for the assembly.

5. Apparatus according to claim 2, wherein said support is a conveyor, and said frame is vertically movable to effect said relative approach.

6. Apparatus according to any one of claims 1 to 4, wherein one of said parallel bars is fixed to the portals.

7. Apparatus according to claim 6, wherein said beams are carried by said three bars and by one of said portals.

8. Apparatus according to any one of claims 1 to 4, wherein clamping means is provided for clamping said assembly together on its support during the treatment.

9. Apparatus according to claim 8, wherein said clamping means comprises weights which are mounted for relative movement with respect to the beams.

10. Apparatus according to claim 9, wherein said weights are carried by each of said beams and mounted for relative vertical movement with respect to the beams.

11. Apparatus according to any one of claims 1 to 4, wherein said treatment means is heating means.

12. Apparatus according to claim 11, wherein said heating means comprises a row of burner nozzles on each of said beams.

13. Apparatus according to claim 12, wherein each row extends substantially the full length of its beam.

14. An apparatus for the manufacture of glazing panels comprising sheets of glazing material bonded together in their margins, which effects bonding between at least one of said sheets and at least one member assembled in marginal contact therewith to form an assembly, comprising: a support for said assembly, a frame comprised of beams which are supported using movable couplings whereby an end of each of said beams is relatively movable along an adjacent beam so that the size of the frame can be adjusted, and treatment means carried by each of said beams arranged for simultaneous energisation to treat each side of said assembly, said treatment means comprising heating means in the form of a row of burner nozzles on each of said beams.

15. Apparatus according to claim 14, wherein each row extends substantially the full length of its beam.

16. Apparatus according to claim 14, wherein said support and frame are arranged for relative approach.

17. Apparatus according to claim 16, wherein said support is a conveyor, and said frame is vertically movable to effect said relative approach.

18. Apparatus according to claim 16, wherein said frame is vertically movable.

19. Apparatus according to claim 18, wherein said beams are connected to a support structure using rams arranged to lower and raise the frame with respect to the support for the assembly.

20. Apparatus according to claim 14, and further comprising a support structure for said beams, wherein said support structure comprises two parallel upstanding portals which are interconnected by first and second parallel bars of which one is fixed to the portals and the other is slidable along them, and wherein said parallel bars are themselves interconnected by a third bar which is parallel to said portals, is slidable along said first and second bars and is slidable across at least one of said first and second bars.

21. Apparatus according to claim 20, wherein said beams are carried by said three bars and by one of said portals.

22. Apparatus according to claim 14, wherein clamping means is provided for clamping said assembly together on its support during the treatment.

23. Apparatus according to claim 22, wherein said clamping means comprises weights which are mounted for relative movement with respect to the beams.

24. Apparatus according to claim 23, wherein the weights are carried by each of said beams and mounted for relative vertical movement with respect to the beams.

25. An apparatus for the manufacture of glazing panels comprising sheets of glazing material bonded together in their margins, which effects bonding between at least one of said sheets and at least one member assembled in marginal contact therewith to form an assembly, comprising: a support for said assembly, a frame comprised of beams which are supported using movable couplings whereby an end of each of said beams is relatively movable along an adjacent beam so that the size of the frame can be adjusted, and treatment means carried by each of said beams arranged for simultaneous energisation to treat each side of said assembly, and clamping means for clamping said assembly together on its support during the treatment, said clamping means comprising weights which are mounted for relative movement with respect to the beams.

26. Apparatus according to claim 25, wherein said support and frame are arranged for relative approach.

27. Apparatus according to claim 26, wherein said frame is vertically movable.

28. Apparatus according to claim 27, wherein said beams are connected to a support structure using rams, arranged to lower and raise the frame with respect to the support for the assembly.

29. Apparatus according to claim 27, wherein the weights are carried by each of said beams and are mounted for relative vertical movement with respect to the beams.

30. Apparatus according to claim 26, wherein the support is a conveyor, and said frame is vertically movable to effect said relative approach.

31. Apparatus according to claim 26, wherein said treatment means is heating means.

32. Apparatus according to claim 25, wherein said heating means comprises a row of burner nozzles on each of said beams, and wherein each row extends substantially the full length of its beam.

33. Apparatus according to claim 25, and further comprising a support structure for said beams, wherein the support structure comprises two parallel upstanding portals which are interconnected by first and second parallel bars of which one is fixed to the portals and the other is slidable along them, and wherein said parallel bars are themselves interconnected by a third bar which is parallel to said portals, is slidable along said first and second bars and is slidable across at least one of said first and second bars.

34. Apparatus according to claim 33, wherein said beams are carried by said three bars and by one of said portals.

* * * * *